(12) United States Patent
Hisano (10) Patent No.: US 9,469,292 B2
(45) Date of Patent: Oct. 18, 2016

(54) HYBRID VEHICLE AND METHOD OF CONTROLLING HYBRID VEHICLE

(71) Applicant: TOYOTA JIDOSHA KABUSHIKI KAISHA, Toyota-shi, Aichi-ken (JP)

(72) Inventor: Taishi Hisano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/644,760

(22) Filed: Mar. 11, 2015

(65) Prior Publication Data

US 2015/0307083 A1    Oct. 29, 2015

(30) Foreign Application Priority Data

Apr. 28, 2014 (JP) ................. 2014-092804

(51) Int. Cl.
| | |
|---|---|
| *B60W 20/00* | (2016.01) |
| *B60W 10/06* | (2006.01) |
| *B60W 10/08* | (2006.01) |
| *B60W 10/26* | (2006.01) |
| *B60W 50/08* | (2012.01) |
| *B60K 6/445* | (2007.10) |

(52) U.S. Cl.
CPC ............ *B60W 20/106* (2013.01); *B60W 10/06* (2013.01); *B60W 10/08* (2013.01); *B60W 10/26* (2013.01); *B60W 20/13* (2016.01); *B60W 50/082* (2013.01); *B60W 50/085* (2013.01); *B60K 6/445* (2013.01); *B60W 2510/0604* (2013.01); *B60W 2510/244* (2013.01); *B60W 2520/105* (2013.01); *B60W 2710/0677* (2013.01); *B60W 2710/086* (2013.01); *B60W 2710/244* (2013.01); *B60W 2710/248* (2013.01); *Y02T 10/52* (2013.01); *Y02T 10/6239* (2013.01); *Y02T 10/6286* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,380,006 | A * | 5/1921 | Nielsen | ................ F16H 15/503 475/189 |
| 5,006,093 | A * | 4/1991 | Itoh | ................ F16H 61/66259 474/28 |
| 5,355,749 | A * | 10/1994 | Obara | ................ B60K 6/543 477/15 |
| 5,722,502 | A * | 3/1998 | Kubo | ................ B60K 6/442 180/65.23 |
| 6,053,833 | A * | 4/2000 | Masaki | ................ B60K 6/445 475/2 |
| 6,119,800 | A * | 9/2000 | McComber | ................ B60K 1/00 180/65.1 |

(Continued)

FOREIGN PATENT DOCUMENTS

| | | |
|---|---|---|
| JP | 2007-062638 A | 3/2007 |
| JP | 2008-168806 A | 7/2008 |

(Continued)

*Primary Examiner* — Jonathan L Sample
(74) *Attorney, Agent, or Firm* — Oliff PLC (57) ABSTRACT

A hybrid vehicle according to the present invention includes an engine, a power storage device, a motor generator, and an ECU. The motor generator receives electric power from the power storage device and generates travel driving force. The ECU selects one of a CD mode and a CS mode to cause the vehicle to travel, in the CD mode an SOC of the power storage device being consumed, in the CS mode the SOC being maintained within a prescribed range. The CS mode includes a first CS mode and a second CS mode, the first CS mode being selected when the SOC decreases to a prescribed amount, the second CS mode being selected based on a user's intention. A second prescribed range corresponding to the second CS mode is set to be wider than a first prescribed range corresponding to the first CS mode.

7 Claims, 6 Drawing Sheets

(56) References Cited

U.S. PATENT DOCUMENTS

| | | | | |
|---|---|---|---|---|
| 6,311,113 B1* | 10/2001 | Danz | ............... | F16H 61/66259 474/28 |
| 6,514,175 B2* | 2/2003 | Taniguchi | ........... | F16H 61/0021 477/138 |
| 6,721,637 B2* | 4/2004 | Abe | ................. | B60K 6/48 180/65.8 |
| 7,011,600 B2* | 3/2006 | Miller | ................. | B62M 9/08 476/36 |
| 7,234,873 B2* | 6/2007 | Kato | ................. | F16C 13/006 384/463 |
| 7,574,935 B2* | 8/2009 | Rohs | ................. | F16H 15/42 474/83 |
| 7,909,727 B2* | 3/2011 | Smithson | ............... | F16H 15/28 476/36 |
| 7,976,426 B2* | 7/2011 | Smithson | ............... | F16H 15/28 476/38 |
| 8,167,759 B2* | 5/2012 | Pohl | ................. | F16H 61/664 180/53.8 |
| 8,171,636 B2* | 5/2012 | Smithson | ............... | F16H 15/28 29/893 |
| 8,321,097 B2* | 11/2012 | Vasiliotis | .............. | B62M 11/16 180/207.1 |
| 8,360,917 B2* | 1/2013 | Nichols | ................ | B62M 11/16 475/189 |
| 8,725,339 B2* | 5/2014 | Justin | ................. | B60W 10/26 180/65.21 |
| 9,283,954 B2* | 3/2016 | Dalum | ................. | H01M 10/48 |
| 2001/0008192 A1* | 7/2001 | Morisawa | ............... | B60K 6/46 180/197 |
| 2001/0044361 A1* | 11/2001 | Taniguchi | ........... | F16H 61/0021 477/111 |
| 2002/0169051 A1* | 11/2002 | Oshidari | ............. | F16H 61/0025 476/10 |
| 2003/0015358 A1* | 1/2003 | Abe | ................. | B60K 6/48 180/65.25 |
| 2003/0015874 A1* | 1/2003 | Abe | ................. | B60K 6/48 290/40 C |
| 2004/0193363 A1* | 9/2004 | Schmidt | ............... | A01B 69/007 701/23 |
| 2005/0113202 A1* | 5/2005 | Miller | ................. | B62D 5/0409 475/215 |
| 2006/0108956 A1* | 5/2006 | Clark | ................. | B60L 3/108 318/139 |
| 2006/0180363 A1* | 8/2006 | Uchisasai | ............... | B60K 6/48 180/65.275 |
| 2006/0231306 A1* | 10/2006 | Severinsky | ............ | B60H 1/004 180/65.23 |
| 2007/0004556 A1* | 1/2007 | Rohs | ................. | F16H 15/42 477/130 |
| 2008/0081728 A1* | 4/2008 | Faulring | ................. | F16H 15/40 476/40 |
| 2008/0276892 A1* | 11/2008 | Doljack | ............... | F02N 11/0866 123/179.28 |
| 2009/0101421 A1 | 4/2009 | Oyobe et al. | | |
| 2009/0306843 A1 | 12/2009 | Jinno et al. | | |
| 2010/0019729 A1* | 1/2010 | Kaita | ................. | B60L 11/123 320/134 |
| 2010/0056322 A1* | 3/2010 | Thomassy | ............... | F16H 15/28 476/39 |
| 2010/0131164 A1* | 5/2010 | Carter | ................. | B60L 11/1805 701/61 |
| 2010/0145560 A1* | 6/2010 | Komatsu | ................ | B60K 6/365 701/22 |
| 2010/0191372 A1* | 7/2010 | Nihei | ................. | B25J 9/1676 700/245 |
| 2011/0114403 A1* | 5/2011 | Hauger | ................ | B60K 6/387 180/65.25 |
| 2011/0257823 A1* | 10/2011 | Watanabe | .............. | B60K 6/445 701/22 |
| 2011/0295456 A1* | 12/2011 | Yamamoto | ............. | B60K 6/445 701/22 |
| 2012/0035015 A1* | 2/2012 | Ogawa | ................. | F16H 3/12 475/186 |
| 2012/0238386 A1* | 9/2012 | Pohl | ................. | F16H 61/664 475/115 |
| 2012/0258839 A1* | 10/2012 | Smithson | ............ | B60H 1/3222 477/42 |
| 2012/0277946 A1* | 11/2012 | Yamamoto | ............. | B60K 6/445 701/22 |
| 2012/0309579 A1* | 12/2012 | Miller | ................. | B62M 9/08 475/189 |
| 2013/0096764 A1* | 4/2013 | Yamamoto | ............. | B60K 6/445 701/22 |
| 2013/0190958 A1* | 7/2013 | Izumi | ................. | B60W 20/20 701/22 |
| 2013/0226379 A1* | 8/2013 | Hirai | ................. | B60K 6/445 701/22 |
| 2013/0297137 A1* | 11/2013 | Fushiki | ................. | B60K 6/445 701/22 |
| 2015/0094892 A1* | 4/2015 | Kanehara | ............... | B60K 6/442 701/22 |
| 2015/0307083 A1* | 10/2015 | Hisano | ................. | B60W 10/06 701/22 |

FOREIGN PATENT DOCUMENTS

| | | |
|---|---|---|
| JP | 2009-143563 A | 7/2009 |
| JP | 2011057116 A | 3/2011 |
| JP | 2012-183952 A | 9/2012 |
| JP | 2015-71342 A | 4/2015 |

* cited by examiner

FIG.6

HYBRID VEHICLE AND METHOD OF CONTROLLING HYBRID VEHICLE

This nonprovisional application is based on Japanese Patent Application No. 2014-092804 filed on Apr. 28, 2014 with the Japan Patent Office, the entire contents of which are hereby incorporated by reference.

BACKGROUND OF THE INVENTION

1. Field of the Invention

The present invention relates to a hybrid vehicle and a method of controlling the hybrid vehicle, and more particularly to control of a hybrid vehicle that travels while switching a mode between a CD (Charge Depleting) mode and a CS (Charge Sustaining) mode.

2. Description of the Background Art

As an environment-friendly vehicle, a hybrid vehicle that travels using driving force from an internal combustion engine and driving force from a rotating electric machine is known.

Japanese Patent Laying-Open No. 2011-57116 discloses a hybrid vehicle including an internal combustion engine and a rotating electric machine. The hybrid vehicle disclosed in Japanese Patent Laying-Open No. 2011-57116 travels while switching a mode between a CD mode in which an SOC (State Of Charge) of a power storage device is consumed and a CS mode in which the SOC is maintained within a prescribed range. When the SOC decreases to a prescribed amount, the mode is automatically switched from the CD mode to the CS mode.

SUMMARY OF THE INVENTION

As described above, in the vehicle that travels while switching the mode from the CD mode to the CS mode in response to a decrease in the SOC to the prescribed amount, the range in which the SOC is maintained in the CS mode may be set to be relatively narrow. This may increase the frequency of driving the engine for maintaining the SOC. Thus, even in the case of a low load condition by which the vehicle can travel only using the driving force from the rotating electric machine (EV traveling), the internal combustion engine is driven, so that the fuel efficiency may decrease.

The present invention has been made to solve the above-described problems. An object of the present invention is to provide a hybrid vehicle that can travel while switching a mode between a CD mode and a CS mode, aiming at improving the fuel efficiency in the CS mode.

A hybrid vehicle according to the present invention includes: an internal combustion engine; a power storage device that is chargeable/dischargeable; a rotating electric machine; and a control device. The rotating electric machine receives electric power from the power storage device and generates travel driving force. The control device is configured to select one of a CD mode and a CS mode to cause the hybrid vehicle to travel. In the CD mode, an SOC of the power storage device is consumed. In the CS mode, the SOC is maintained within a prescribed range. The CS mode includes a first CS mode selected when the SOC decreases to a prescribed amount and a second CS mode selected based on an intention of a user. A second prescribed range corresponding to the second CS mode is set to be wider than a first prescribed range corresponding to the first CS mode.

Furthermore, a method of controlling a hybrid vehicle according to the present invention is a method of controlling a hybrid vehicle including an internal combustion engine and a rotating electric machine that operates using electric power from a power storage device. The above-described controlling method includes the step of: selecting one of a CD mode and a CS mode to cause the hybrid vehicle to travel. In the CD mode, an SOC of the power storage device is consumed. In the CS mode, the SOC is maintained within a prescribed range. The CS mode includes a first CS mode selected when the SOC decreases to a prescribed amount and a second CS mode selected based on an intention of a user. This controlling method further includes the step of: setting a second prescribed range corresponding to the second CS mode to be wider than a first prescribed range corresponding to the first CS mode.

According to the hybrid vehicle configured as described above and the method of controlling the hybrid vehicle, even if the SOC does not decrease to the prescribed amount, the CS mode can be selected by the user's intention. Also, in the CS mode selected by the user (the second CS mode), a variable range (a prescribed range) in which the SOC is maintained is set to be wider than that in the case of the CS mode automatically selected in response to a decrease in the SOC to the prescribed amount (the first CS mode). Thereby, the opportunity (time period) to perform EV traveling can be increased also in the CS mode (the second CS mode), so that the fuel efficiency can be improved.

Preferably, when a prescribed mode in which reduction in fuel consumption is prioritized over acceleration is selected in the second CS mode, the control device sets the second prescribed range to be further wider than that in a case where the prescribed mode is not selected.

According to such a configuration, when a so-called ECO mode in which reduction in fuel consumption is prioritized is selected in the second CS mode selected by the user, the prescribed range of the SOC at the time when the SOC is maintained is set to be wider than that in the case where the ECO mode is not selected. This leads to a reduction in frequency of starting the internal combustion engine for charging the power storage device when the ECO mode is selected. Accordingly, the opportunity to perform EV traveling can be increased. Therefore, the fuel efficiency of the internal combustion engine can be further improved.

Preferably, when required power becomes larger than a prescribed threshold value, the control device drives the internal combustion engine to cause the hybrid vehicle to travel using driving force from the internal combustion engine in addition to driving force from the rotating electric machine. When the above-described prescribed mode (ECO mode) is set in the second CS mode, the control device sets the prescribed threshold value to be larger than that in a case where the ECO mode is not selected.

According to such a configuration, in the case where the ECO mode is set in the second CS mode, the threshold value for starting the internal combustion engine in accordance with an increase in the required power is set to be larger than that in the case of the first CS mode. This leads to a reduction in frequency of starting the internal combustion engine when the user requiring power is increased, so that fuel efficiency can be further improved.

Preferably, when the internal combustion engine is operated in a case where the second CS mode is selected, the control device adjusts required charge power so as to be close to a prescribed operating point at which operating efficiency of the internal combustion engine is enhanced.

According to such a configuration, in the case where the internal combustion engine needs to be started when the second CS mode is set, the required charge power is adjusted such that the operating efficiency of the internal combustion engine is enhanced as much as possible. Thereby, for example, in the case where the power storage device needs to be charged as the SOC decreases during a low load condition, the required charge power is increased to increase the load on the internal combustion engine, thereby suppressing the internal combustion engine from being operated at an inefficient operating point. Consequently, the fuel efficiency can be further improved.

Preferably, the first prescribed range is determined based on the prescribed amount, and the second prescribed range is determined based on the SOC at a time when the second CS mode is selected by the user.

According to such a configuration, in the second CS mode selected by the user, control is carried out such that the SOC requested by the user (the SOC at the point of time when the user made a selection) is maintained, thereby allowing control to be carried out so as to reflect the user's intention.

Preferably, when the CS mode is selected, the control device sets required charge power for the power storage device in accordance with the SOC. When the second CS mode is selected, the control device sets the required charge power to be larger than that in a case where the first CS mode is selected.

According to such a configuration, the required charge power in the CS mode is set in accordance with the current SOC (more specifically, in accordance with a deviation between the current SOC and the SOC target value), and this required charge power is set to be larger in the second CS mode than in the first CS mode. Thereby, in the second CS mode, the required charge power is relatively increased when the internal combustion engine is operated. Therefore, the load of the internal combustion engine is increased, so that the internal combustion engine can be operated at a more efficient operating point.

According to the present invention, in the hybrid vehicle that can travel while switching a mode between the CD mode and the CS mode, the second CS mode that can be set by the user's intention is used, thereby allowing improvement in the fuel efficiency during execution of the CS mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described in detail with reference to the drawings. In the drawings, the same or corresponding components are designated by the same reference characters, and a description thereof will not be repeated.

[Basic Configuration of Vehicle]

Figure 1:
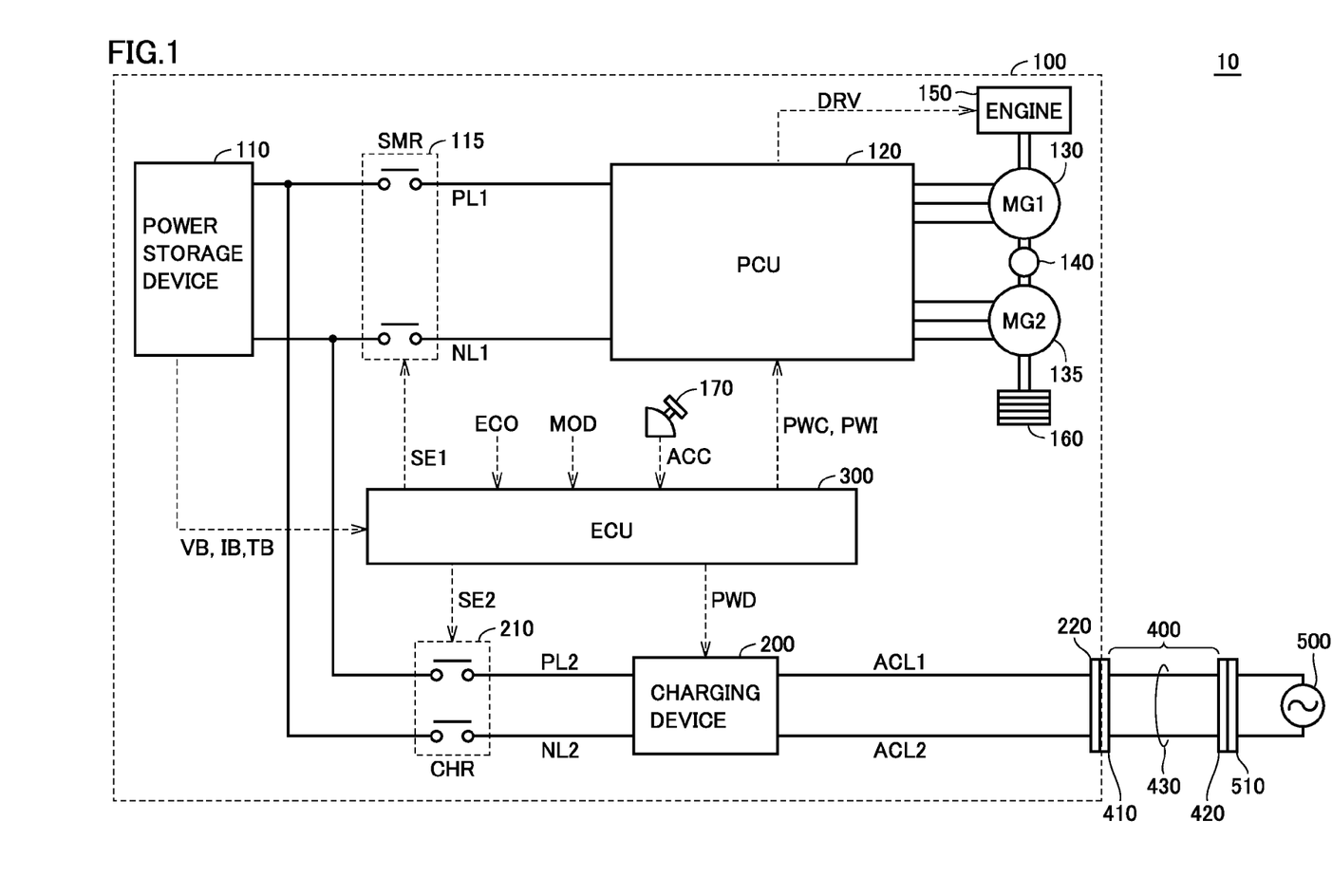
FIG. 1 is an overall block diagram of a hybrid vehicle according to the present embodiment.

FIG. 1 is an overall block diagram of a charging system 10 including a hybrid vehicle 100 according to the present embodiment.

Referring to FIG. 1, vehicle 100 includes a power storage device 110, a system main relay (SMR) 115, a PCU (Power Control Unit) 120 serving as a drive device, motor generators 130 and 135, a power transmission gear 140, an engine 150 serving as an internal combustion engine, a driving wheel 160, an accelerator pedal 170, and an ECU (Electronic Control Unit) 300 serving as a control device.

Power storage device 110 is a chargeable and dischargeable electric power storage component. Power storage device 110 is configured to include, for example, a secondary battery such as a lithium-ion battery and a nickel-metal hydride battery, or a power storage element such as an electric double layer capacitor.

Power storage device 110 is connected to PCU 120 through power lines PL1 and NL1. Power storage device 110 supplies electric power for generating driving force for vehicle 100 to PCU 120. Furthermore, power storage device 110 stores the electric power generated by motor generators 130 and 135. The output voltage of power storage device 110 is, for example, approximately 200V.

Power storage device 110 includes a voltage sensor, a current sensor, and a temperature sensor (that are not shown), and outputs a voltage VB, a current IB, and a temperature TB of power storage device 110 detected by these sensors to ECU 300.

SMR 115 includes: a relay having one end connected to the positive electrode of power storage device 110 and the other end connected to power line PL1; and a relay having one end connected to the negative electrode of power storage device 110 and the other end connected to power line NL1. Each relay included in SMR 115 is controlled based on a control signal SE1 from ECU 300, to switch supply and cut-off of the electric power between power storage device 110 and PCU 120.

PCU 120 is configured to include a converter and an inverter, for example. PCU 120 is controlled by control signals PWC and PWI from ECU 300 to convert direct-current (DC) power from power storage device 110 into alternating-current (AC) power for driving motor generators 130 and 135. Furthermore, PCU 120 converts the electric power generated by motor generators 130 and 135 to charge power storage device 110.

Motor generators 130 and 135 each are an AC rotating electric machine, and, for example, a permanent magnet-type synchronous electric motor provided with a rotor into which a permanent magnet is embedded. The output torque of each of motor generators 130 and 135 is transmitted to driving wheel 160 through power transmission gear 140 formed to include a reduction gear and a power split device, for causing vehicle 100 to travel. Motor generators 130 and 135 can generate electric power by the rotating force of driving wheel 160 during the regenerative braking operation of vehicle 100. PCU 120 then converts the generated electric power into electric power for charging power storage device 110.

In the present embodiment, motor generator 135 is used as an electric motor solely for driving the driving wheel 160 while motor generator 130 is used as a power generator solely driven by engine 150. Furthermore, engine 150 is controlled by ECU 300 using a control signal DRV.

Vehicle 100 includes a charging device 200, a charging relay CHR 210 and a connection unit 220 as a configuration for charging power storage device 110 using the electric power from an external power supply 500.

Connection unit 220 is provided in the body of vehicle 100 for receiving electric power from external power supply 500. A charging connector 410 of a charging cable 400 is connected to connection unit 220. Then, a plug 420 of charging cable 400 is connected to a receptacle 510 of external power supply 500, so that the electric power from external power supply 500 is transmitted to vehicle 100 through a power line unit 430 of charging cable 400. Furthermore, power line unit 430 of charging cable 400 may be provided with a charging circuit interrupt device (not shown) for switching supply and cut-off of electric power from external power supply 500 to vehicle 100.

Charging device 200 is connected to connection unit 220 through power lines ACL1 and ACL2. Furthermore, charging device 200 is connected through CHR 210 to power storage device 110. Based on a control signal PWD from ECU 300, charging device 200 converts AC power supplied from external power supply 500 into DC power with which power storage device 110 can be charged.

CHR 210 includes: a relay having one end connected to the positive electrode terminal of power storage device 110 and the other end connected to power line PL2; and a relay having one end connected to the negative electrode terminal of power storage device 110 and the other end connected to power line NL2. Based on a control signal SE2 from ECU 300, CHR 210 switches supply and cut-off of the electric power from charging device 200 to power storage device 110.

ECU 300 including a CPU (Central Processing Unit), a storage device and an input and output buffer that are not shown in FIG. 1 receives a signal from each sensor and the like and outputs a control signal to each device. ECU 300 also controls power storage device 110 and each device in vehicle 100. It is to be noted that the above-described control is not limited to processing by software, but can be carried out by dedicated hardware (an electronic circuit).

ECU 300 calculates a state of charge SOC of power storage device 110 based on the detected values of voltage VB, current IB and temperature TB from power storage device 110. ECU 300 receives, from accelerator pedal 170, a signal ACC representing the amount of operation of an accelerator pedal 170 by the user.

The hybrid vehicle in the present embodiment is configured to travel while switching a mode between the CD mode and the CS mode.

The CS mode is a mode in which the SOC is maintained within a prescribed range determined based on the target value of the SOC. In the CS mode, when the SOC decreases to the lower limit of the above-described prescribed range, engine 150 is driven to cause motor generator 130 to generate electric power, and then, power storage device 110 is charged using this generated electric power. Then, when the SOC is recovered to the upper limit of the prescribed range, charging of power storage device 110 is stopped.

The CD mode is a mode in which the SOC of power storage device 110 is consumed without maintaining this SOC within the prescribed range. In other words, basically in the CD mode, engine 150 is not driven for the purpose of charging power storage device 110, but the SOC decreases gradually as the vehicle travels.

In the CD mode, a so-called EV (Electric Vehicle) traveling is mainly employed, in which the vehicle travels using only the driving force generated by motor generator 135. In addition, when the power required by the user cannot be achieved only with the driving force generated by motor generator 135, or when the electric power for driving auxiliary equipment (not shown) such as an air-conditioner is required, engine 150 is driven also in the CD mode.

Furthermore, ECU 300 receives CS mode selection information MOD set by the user operation, and selection information ECO of the traveling mode in which the fuel efficiency is prioritized. These pieces of information are output by the user operating a prescribed switch provided inside the driver's cab or an operation panel used for a navigation device and the like.

Figure 2:
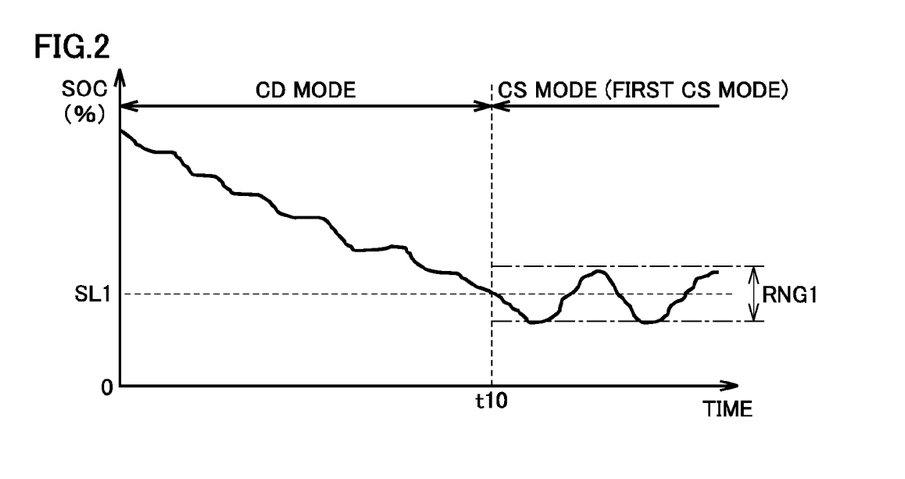
FIG. 2 is a diagram for illustrating a CD mode and a CS mode.

FIG. 2 is a diagram for illustrating an example of switching the mode between the CD mode and the CS mode as described above. Referring to FIG. 2, for example, when the vehicle starts travelling in the state where power storage device 110 is in the fully charged state, the CD mode is first selected, in which case the vehicle travels while consuming the SOC until the SOC decreases to a prescribed amount SL1. Then, when the SOC reaches prescribed amount SL1 at time t10, the CD mode is automatically switched to the CS mode. In the CS mode, engine 150 is driven as appropriate for charging power storage device 110 such that the SOC is maintained within a control range RNG1 (for example, SL1±5%) defined based on prescribed amount SL1.

More specifically, in response to a decrease in the SOC to the lower limit of control range RNG1, engine 150 is driven to charge power storage device 110. Then, in response to recovery of the SOC to the upper limit of control range RNG1, charging of power storage device 110 is stopped. In this way, in the CS mode, the SOC is maintained within prescribed control range RNG1 while repeating charging and discharging of power storage device 110. In addition, as having been described with reference to FIG. 2, the CS mode that is automatically switched in response to a decrease in the SOC to a prescribed amount shall be referred to as the first CS mode in the present embodiment.

Although an explanation has been given in FIG. 1 by way of example with regard to the configuration of a so-called plug-in hybrid vehicle in which a power storage device can be charged using electric power from a power supply external to the vehicle, the hybrid vehicle in the present embodiment may be a hybrid vehicle not having an externally charging function.

First Embodiment

In addition to the CS mode to which the mode is automatically switched as the SOC decreases to the prescribed amount as described above (the first CS mode), there are some hybrid vehicles having a configuration capable of selecting the CS mode that is switched from the CD mode at desired timing by the user's intention (which will be also referred to as the second CS mode). This second CS mode is selected, for example, when the user wants to preserve the SOC.

In the case of the first CS mode, prescribed amount SL1 of the SOC for mode switching (that is, a target SOC in the first CS mode) may be set to be relatively low in order to allow the CD mode to be continued as long as possible. Accordingly, as to the variable range (control range RNG1 mentioned above), a margin particularly in the direction of the lower limit is relatively small, with the result that the control range is to be set relatively narrow. When the CS mode is applied in such a relatively narrow control range, there occurs an increase in frequency of starting the engine for charging as the SOC decreases to the lower limit of the control range. Also, the time period during which the SOC is consumed becomes relatively short even after recovery of the SOC. As a result, the fuel efficiency may decrease.

On the other hand, in the second CS mode, since the SOC target value is basically set to be higher than that in the case of the first CS mode, a margin in the direction of the lower limit of the control range can be set to be relatively large. Consequently, a decrease in fuel efficiency as described above can be suppressed.

Therefore, according to the present embodiment, in the second CS mode, the control range in which the SOC is maintained is set to be wider than the control range in the first CS mode. This leads to a reduction in the frequency of starting the engine in the second CS mode and also leads to an increase in the time period during which the vehicle travels while consuming the SOC. Therefore, the SOC can be maintained within a prescribed range while suppressing a decrease in fuel efficiency in the CS mode.

Figure 3:
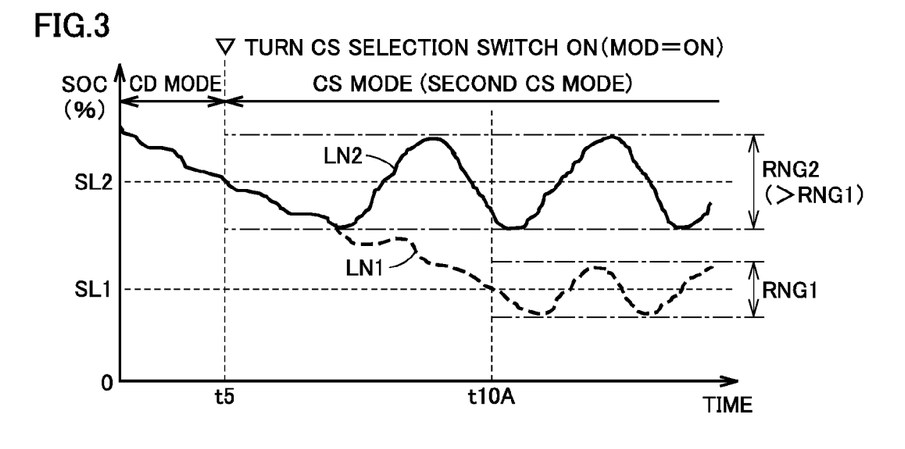
FIG. 3 is a diagram for illustrating an outline of switching control for the CS mode that is carried out in the first embodiment.

FIG. 3 is a diagram for illustrating switching control in the CS mode in the first embodiment. In FIG. 3, a dashed line LN1 shows the first CS mode explained with reference to FIG. 2 while a solid line LN2 shows the second CS mode in the present first embodiment. Since the first CS mode is the same as that in FIG. 2, description thereof will not be repeated.

Referring to FIG. 3, when the vehicle starts traveling in the fully charged state as in FIG. 2, the CD mode is first selected, in which case the vehicle travels while consuming the SOC. When the CS mode is selected by the user operating the CS selection switch at time t5 at which the SOC is equivalent to SL2 larger than prescribed amount SL1, the second CS mode is selected to carry out control such that the SOC is maintained within a control range RNG2 determined based on SL2. In this case, control range RNG2 corresponding to a variable range of the SOC is set to be wider than control range RNG1 in the first CS mode (for example, SL2±10%).

In the second CS mode, since the value of SL2 that is a target SOC is larger than SL1, a margin in the direction of the lower limit is relatively large as compared with the case of SL1. Accordingly, control range RNG2 can be set to be wider than control range RNG1. The control range that is set to be relatively wide in this way allows a reduction in frequency of starting engine 150, and also allows an increase in the time period during which the vehicle can travel while consuming the SOC after recovery of the SOC.

FIG. 3 shows an example in which control range RNG2 is set such that ranges to the upper limit and the lower limit are equal with respect to SL2 defined as the center and representing the SOC at the time when the user operation is performed. However, for example, the upper limit value may be set in a range similar to that in the case of the first CS mode (SL2+5%) and only the lower limit value may be set in a range wider than that in the case of the first CS mode (SL2−10%).

Figure 4:
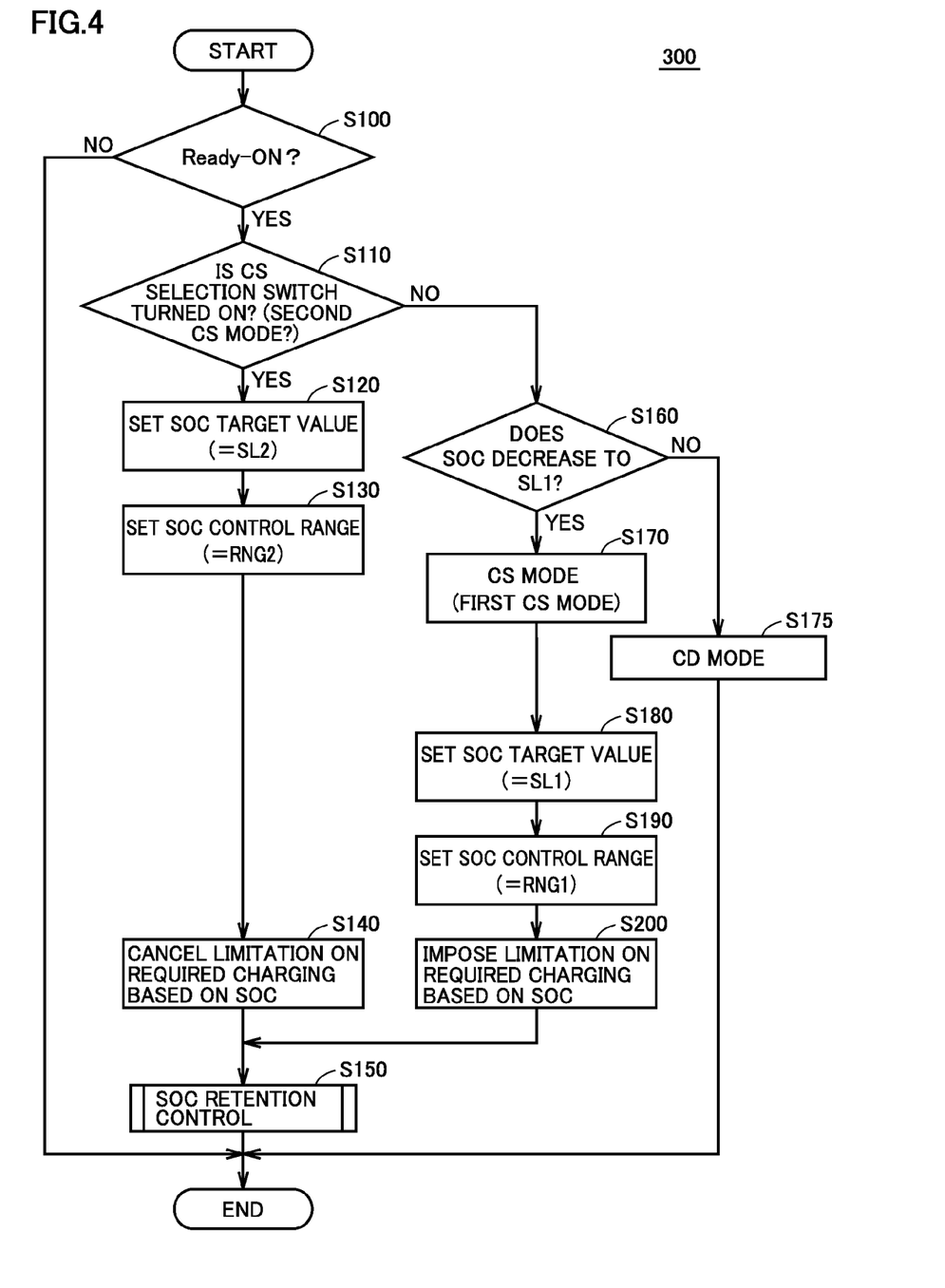
FIG. 4 is a flowchart for illustrating details of a process of mode switching control carried out by an ECU in the first embodiment.

FIG. 4 is a flowchart for illustrating a process of mode switching control executed by ECU 300 in order to implement the control as described above. Each step in the flowchart shown in each of FIGS. 4 and 7 which will be described later is implemented by executing a program stored in ECU 300 in advance in a prescribed cycle. Alternatively, the process may also be implemented for a portion of the steps by developing dedicated hardware (electronic circuit).

Referring to FIGS. 1 and 4, ECU 300 determines in step (which will be hereinafter abbreviated as S) 100 whether or not vehicle 100 is in a Ready-ON state in which the vehicle is ready to travel. The Ready-ON state specifically means the state where SMR 115 is closed and a preparation for driving PCU 120 and engine 150 is completed.

When vehicle 100 is not in the Ready-ON state (NO in S100), vehicle 100 is still not ready to travel and the mode does not need to be selected. Accordingly, ECU 300 skips subsequent steps and terminates the process.

When vehicle 100 is in the Ready-ON state (YES in S100), the process proceeds to S110, in which ECU 300 determines whether the CS selection switch is turned on or not by the user, that is, whether the second CS mode is selected or not.

When the second CS mode is not selected by the user operation (NO in S110), ECU 300 proceeds the process to S160, in which ECU 300 determines whether or not the SOC decreases to prescribed amount SL1. When the SOC does not decrease to SOC target value SL1 (NO in S160), ECU 300 determines that the timing is not appropriate to shift the mode to the CS mode. Then, ECU 300 proceeds the process to S175 and selects the CD mode. When the CD mode is selected, ECU 300 carries out control so as to cause vehicle 100 to travel while consuming the SOC in the state where charging of power storage device 110 aiming at maintaining the SOC is suppressed.

When the SOC decreases to prescribed amount SL1 (YES in S160), the process proceeds to S170, in which ECU 300 selects the CS mode (first CS mode). Then, ECU 300 sets the above-described prescribed amount SL1 at an SOC target value in the CS mode in S180, and sets the control range in the CS mode at RNG1 in S190. Then, ECU 300 imposes a limitation on the required charge power based on the SOC in S200.

Figure 5:
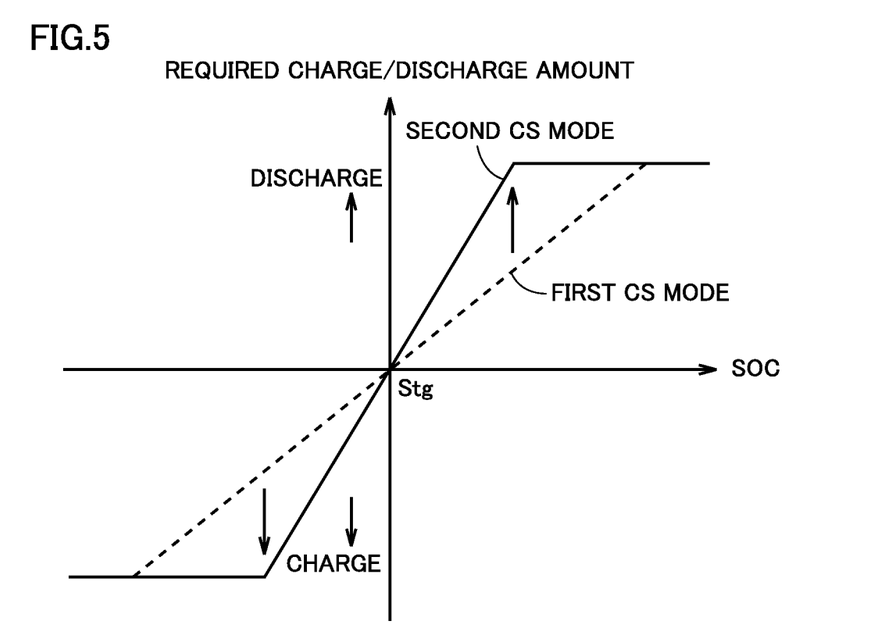
FIG. 5 is a diagram for illustrating the relation between an SOC and required charge/discharge power in each mode.

As described above, control range RNG1 in the first CS mode is set to be relatively narrow. Therefore, when the required charge power is set to be relatively large, the recovery time of the SOC becomes short, with the result that engine 150 may be frequently started/stopped. For this reason, in the first CS mode, as shown in FIG. 5, the required charge power (and required discharge power) set in accordance with the deviation of the SOC from an SOC target value Stg is set so as to be changed relatively gradually as compared with the normal case (and with the second CS mode), thereby suppressing engine 150 from being frequently started/stopped. In addition, limitation on the required charge power in S200 is not indispensable, but further limitation does not have to be imposed, for example, in the case where the required charge power is set in advance to be relatively gradually changed.

Then, ECU 300 proceeds the process to S150, and carries out SOC retention control for starting engine 150 to recover the SOC. In this SOC retention control, until the SOC reaches the upper limit value of control range RNG1, power storage device 110 is charged using the electric power generated by driving motor generator 135 by engine 150.

On the other hand, when the second CS mode is selected by the user's operation in S110 (YES in S110), ECU 300 proceeds the process to S120, in which ECU 300 sets the SOC achieved at the point of time when the user operation is performed as a target value SL2, and also sets control range RNG2 of the SOC (>RNG1) in S130, as having been described with reference to FIG. 3.

Then, in S140, ECU 300 cancels limitations on the required charge power and the required discharge power in the first CS mode as shown in FIG. 5. In S150, ECU 300 carries out SOC retention control. In the second CS mode, the control range is set to be relatively wide. Accordingly, even if the required charge power is set to be relatively large, it becomes possible to provide a lengthened time period during which the EV traveling can be performed after recovery of the SOC, so that the fuel efficiency is less likely to decrease. Furthermore, when the required charge power is set to be relatively large, even during low load traveling, the load of engine 150 is increased to drive engine 150 at a more efficient operating point, thereby allowing a reduction in fuel consumption and also allowing a reduction in time period for driving engine 150 that is required for recovering the SOC.

By carrying out control according to the process as described above, in a hybrid vehicle that can travel while switching the mode between the CD mode and the CS mode, the mode can be switched from the CD mode to the CS mode as appropriate by the user's intention. Also, in the CS mode selected by the user (second CS mode), when the variable range of the SOC is set to be wider than that in the case of the CS mode to which the mode is automatically switched as the SOC decreases (first CS mode), the frequency of starting the engine can be reduced, and also, the time period during which EV traveling can be performed can be set to be relatively long. Furthermore, during engine driving, the engine can be driven at a more efficient operating point. Thereby, the fuel efficiency in the CS mode can be improved.

Second Embodiment

In the first embodiment, an explanation has been given with regard to an example in which the control range of the SOC in the CS mode selected by the user's operation (second CS mode) is set to be wider than the control range in the first CS mode.

There are some vehicles that are known to be capable of setting a traveling mode in which improvement in fuel efficiency is prioritized over the traveling performance (which will be hereinafter also referred to as an "ECO mode"). In such a vehicle capable of setting the ECO mode, further improvement in fuel efficiency may be required in the second CS mode.

Explained in the second embodiment will be an example of an approach to improving the fuel efficiency in the case where the ECO mode is also selected when the second CS mode is selected. More specifically, in the second embodiment, when the ECO mode is selected in the second CS mode, the control range in the above-described first embodiment is set to be further wide while the engine start-up threshold value for the system requiring power is set to be relatively high. Thereby, the frequency of starting the engine is further reduced, so that the fuel efficiency in the CS mode can be further improved.

In addition, when the control range is set to be further wide, the SOC greatly changes in spite of being in the CS mode in which the SOC is maintained. However, the user himself/herself who selected the ECO mode expects that the control is changed so as to give priority to the fuel efficiency. Therefore, even if the SOC changes greatly to some extent, such a change of the SOC is less likely to be problematic.

Figure 6:
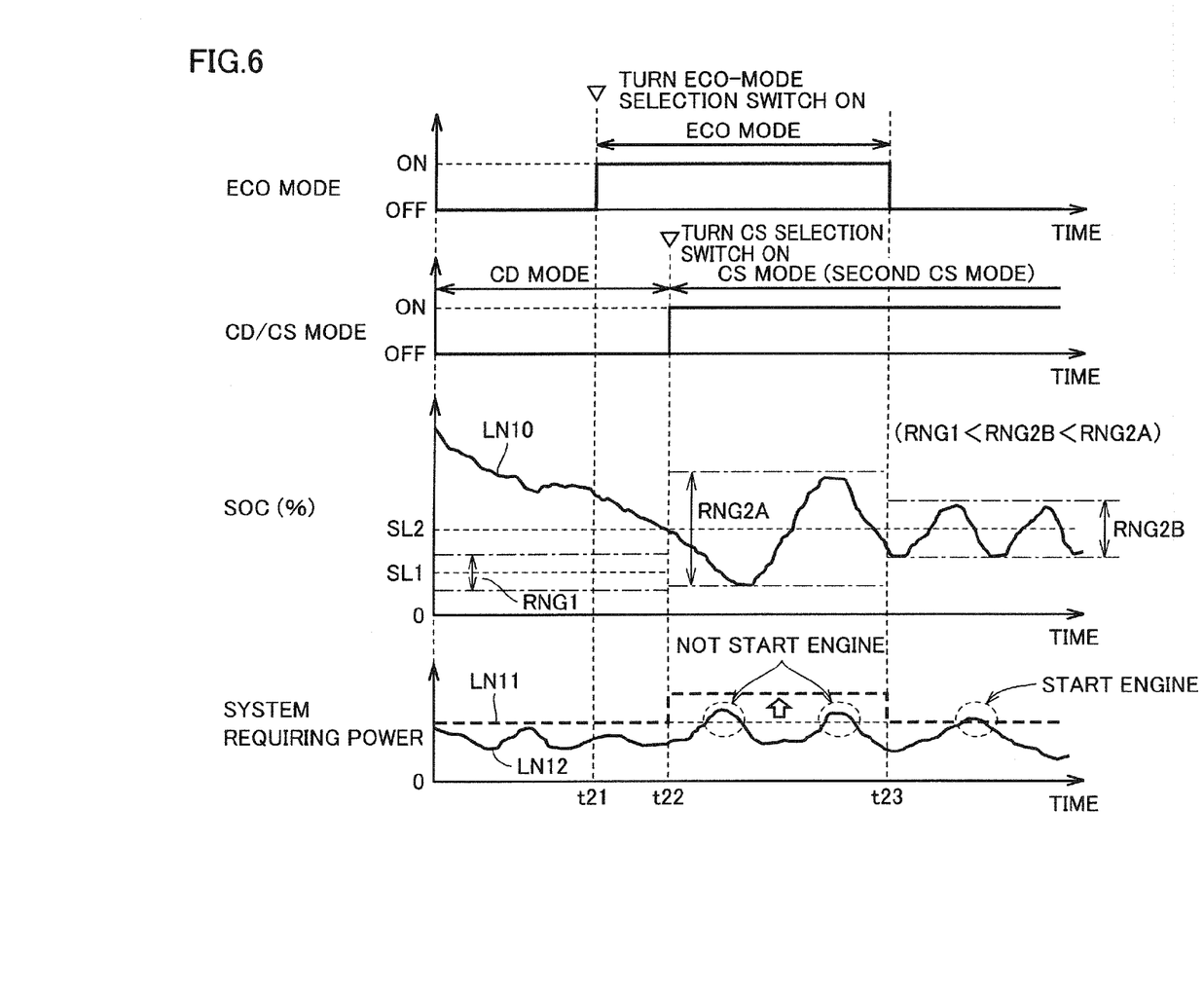
FIG. 6 is a time chart for illustrating an outline of control in the second embodiment.

FIG. 6 is a time chart for illustrating an outline of control in the second embodiment. In FIG. 6, the horizontal axis shows time while the vertical axis shows the set state of the ECO mode, the set state of the CD/CS mode, the SOC, and the system requiring power.

In this case, the system requiring power is defined as power required in the entire system that is obtained by combining: power required by the user based on an accelerator pedal operation amount ACC; power required for driving auxiliary devices; required charge power of the power storage device; and the like. When the system requiring power (a solid line LN12 in FIG. 6) exceeds a prescribed threshold value (a dashed line LN11 in FIG. 6), the engine is started.

Referring to FIG. 6, until time t21, the ECO mode is not set and the SOC is larger than prescribed amount SL1, which means that the CD mode is selected.

The ECO mode is selected by the user operation at time t21. In the ECO mode, it is known that various measures for reducing the fuel consumption are to be taken against control for an engine, a motor generator, an auxiliary device and/or the like. In FIG. 6, even if the ECO mode is selected at time t21, the CD mode is continued since the SOC is larger than prescribed amount SL1.

At time t22, when the CS mode is selected by the user's operation (the second CS mode), the SOC at the selection time point (time t22) is set as target value SL2 while the SOC variable range (control range) is set at RNG2A, as having been explained with reference to FIG. 3. Control range RNG2A at this time is set to be further wider than control range RNG2B (corresponding to RNG2 in FIG. 3) in the second CS mode in case where the ECO mode is not selected (at and after time t23 in FIG. 6). Thereby, the frequency of starting the engine can be further reduced as compared with the case in the CD mode and in the second CS mode during which the ECO mode is not selected.

Furthermore, in the second embodiment, when the second CS mode is selected in the ECO mode, the engine start-up threshold value of the system requiring power is set to be higher than that in the normal case, as shown by dashed line LN11 in FIG. 6. Thereby, even if the system requiring power increases, the engine is less likely to be started, so that the frequency of starting the engine can be further reduced.

Figure 7:
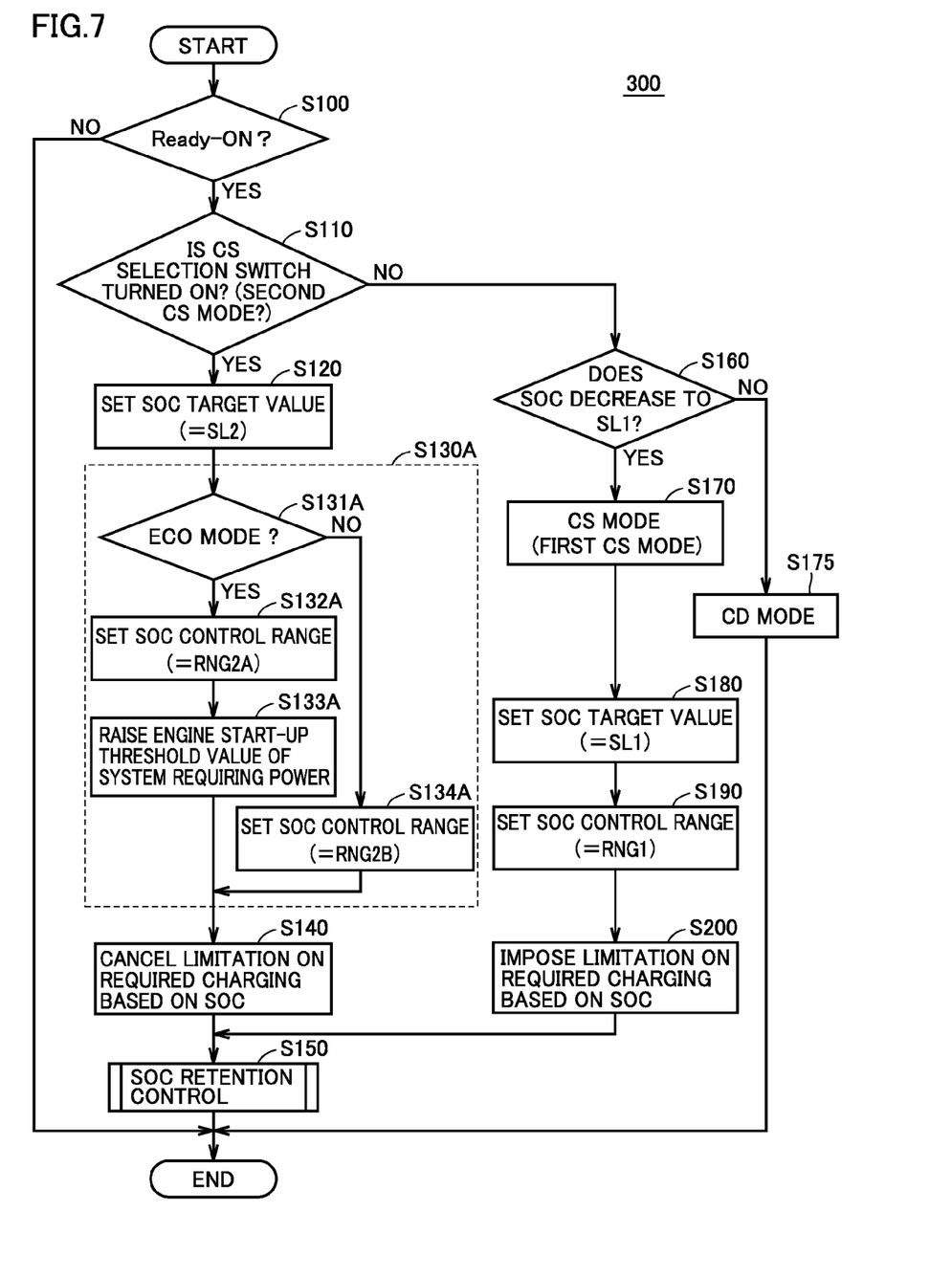
FIG. 7 is a flowchart for illustrating details of a process of mode switching control carried out by an ECU in the second embodiment.

FIG. 7 is a flowchart for illustrating details of a process of mode switching control carried out in the second embodiment. FIG. 7 shows the same flowchart that has been explained with reference to FIG. 4 in the first embodiment except that step S130 is replaced with step S130A. Step S130A includes step S131A to S134A. It is to be noted that the explanation of the same steps as those in FIG. 4 will not be repeated in FIG. 7.

Referring to FIG. 7, when the second CS mode is selected by user selection (YES in S110), the process proceeds to S120, in which ECU 300 sets, as target value SL2, the SOC at the time when the second CS mode is selected.

Then, in S131A, ECU 300 determines whether the ECO mode is selected or not by the user operation.

When the ECO mode is not selected (NO in S131A), the process proceeds to S134A, in which ECU 300 sets the control range at RNG2B (>RNG1), and proceeds the process to S140.

On the other hand, when the ECO mode is selected (YES in S131A), the process proceeds to S132A, in which ECU 300 sets the control range at RNG2A (>RNG2B). Furthermore, ECU 300 raises the engine start-up threshold value of system requiring power in S133A. Then, ECU 300 proceeds the process to S140.

ECU 300 cancels limitation on the required charge power based on the SOC in S140, and performs SOC retention control in S150 such that the SOC is maintained within the control range set in S132A or S134A.

Although not shown in FIG. 6, when the ECO mode and the second CS mode are not selected, the engine start-up threshold value of the system requiring power is reset to a normal value.

By performing control according to the process as described above, when the ECO mode is also selected in the second CS mode, the frequency of starting the engine can be further reduced as compared with the case where the ECO mode is not selected. Accordingly, the fuel efficiency in the CS mode can be improved.

In addition, FIG. 7 shows an example in which both of expansion of the SOC control range in the second CS mode and an increase in the engine start-up threshold value are implemented when the ECO mode is selected, but only one of them may be implemented.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
   an internal combustion engine;
   a power storage device that is chargeable/dischargeable;
   a rotating electric machine configured to receive electric power from the power storage device and generates travel driving force; and
   a control device for selecting one of a CD (Charge Depleting) mode and a CS (Charge Sustaining) mode to cause the hybrid vehicle to travel, in the CD mode an SOC of the power storage device being consumed, in the CS mode the SOC being maintained within a prescribed range,
   the CS mode including a first CS mode and a second CS mode, the first CS mode being selected when the SOC decreases to a prescribed amount, the second CS mode being selected based on an intention of a user, and
   a second prescribed range corresponding to the second CS mode being set to be wider than a first prescribed range corresponding to the first CS mode.

2. The hybrid vehicle according to claim 1, wherein, when a prescribed mode in which reduction in fuel consumption is prioritized over acceleration is selected in the second CS mode, the control device sets the second prescribed range to be further wider than that in a case where the prescribed mode is not selected.

3. The hybrid vehicle according to claim 1, wherein
   when required power becomes larger than a prescribed threshold value, the control device drives the internal combustion engine to cause the hybrid vehicle to travel using driving force from the internal combustion engine in addition to driving force from the rotating electric machine, and
   when a prescribed mode in which reduction in fuel consumption is prioritized over acceleration is set in the second CS mode, the control device sets the prescribed threshold value to be larger than that in a case where the prescribed mode is not selected.

4. The hybrid vehicle according to claim 1, wherein, when the internal combustion engine is operated in a case where the second CS mode is selected, the control device adjusts required charge power so as to be close to a prescribed operating point at which operating efficiency of the internal combustion engine is enhanced.

5. The hybrid vehicle according to claim 1, wherein
   the first prescribed range is determined based on the prescribed amount, and
   the second prescribed range is determined based on the SOC at a time when the second CS mode is selected by the user.

6. The hybrid vehicle according to claim 1, wherein
   when the CS mode is selected, the control device sets required charge power for the power storage device in accordance with the SOC, and
   when the second CS mode is selected, the control device sets the required charge power to be larger than that in a case where the first CS mode is selected.

7. A method of controlling a hybrid vehicle by a controller, the vehicle including an internal combustion engine and a rotating electric machine that operates using electric power from a power storage device, the method comprising the step of:
   selecting one of a CD mode and a CS mode as a traveling mode of the hybrid vehicle, in the CD mode an SOC of the power storage device being consumed, in the CS mode the SOC being maintained within a prescribed range; and
   controlling the hybrid vehicle based on the selected traveling mode,
   the CS mode including a first CS mode and a second CS mode, the first CS mode being selected when the SOC decreases to a prescribed amount, the second CS mode being selected based on an intention of a user, the method further comprising the step of:
   setting a second prescribed range corresponding to the second CS mode to be wider than a first prescribed range corresponding to the first CS mode.

* * * * *